(12) United States Patent
Takushima et al.

(10) Patent No.: US 6,473,150 B1
(45) Date of Patent: Oct. 29, 2002

(54) LIQUID CRYSTAL DISPLAY APPARATUS WITH A FIRST BLOWER FOR BLUE SECTION AND A SECOND BLOWER FOR RED AND GREEN SECTIONS

(75) Inventors: Akira Takushima, Yamatotakada; Fumio Kokubo, Shiki-gun; Shigenori Ohtani, Yaita, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/624,011

(22) Filed: Jul. 21, 2000

(30) Foreign Application Priority Data

Jul. 21, 1999 (JP) .......................... 11-205731

(51) Int. Cl.[7] .................. G03B 21/16; G02F 1/1333
(52) U.S. Cl. .............. 349/161; 349/8; 353/58
(58) Field of Search ............... 349/161, 5, 6, 349/7, 8, 9; 353/58, 57, 52, 61, 60, 31, 33, 34, 37

(56) References Cited

U.S. PATENT DOCUMENTS

| | | | |
|---|---|---|---|
| 5,651,599 A | * | 7/1997 | Fujimori et al. .............. 353/61 |
| 5,772,300 A | | 6/1998 | Kitai |
| 5,838,415 A | * | 11/1998 | Hayashi et al. ............. 349/161 |
| 5,892,561 A | | 4/1999 | Suzuki et al. |
| 6,007,205 A | * | 12/1999 | Fujimori ...................... 353/57 |
| 6,231,191 B1 | * | 5/2001 | Shiraishi et al. .............. 353/61 |

FOREIGN PATENT DOCUMENTS

| | | |
|---|---|---|
| EP | 0 803 754 A1 | 10/1997 |
| JP | A6194621 | 7/1994 |
| JP | A9113998 | 5/1997 |

OTHER PUBLICATIONS

"A 750–TV–Line–Resolution Projector Using 1.5–Megapixel A–SI TFT LC Modules", Kazuhiko Takeuchi et al., *SID International Symposium Digest of Technical Papers*, vol. 22, pp. 415–418, 1991.

* cited by examiner

*Primary Examiner*—Toan Ton
*Assistant Examiner*—Andrew Schechter
(74) *Attorney, Agent, or Firm*—Birch, Stewart, Kolasch & Birch, LLP

(57) ABSTRACT

It is an object of the invention to provide a liquid crystal display apparatus capable of reducing the difference in temperature rise between liquid crystal panels and polarizers for respective colors, suppressing a temperature rise, and reducing noise caused by a fan. The liquid crystal display apparatus includes a hermetic container, and liquid crystal display sections for respective colors, namely, red, green and blue, each including a liquid crystal panel and polarizers. A cooling fan for blue sends cooling air to the liquid crystal display section for blue. A cooling fan for green and red sends cooling air to the liquid crystal display sections for green and red.

9 Claims, 8 Drawing Sheets

LIQUID CRYSTAL DISPLAY APPARATUS WITH A FIRST BLOWER FOR BLUE SECTION AND A SECOND BLOWER FOR RED AND GREEN SECTIONS

BACKGROUND OF THE INVENTION

1. Field of the Invention

The present invention relates to a liquid crystal display apparatus and, more particularly, to a liquid crystal display apparatus having a simple arrangement for effectively preventing the temperature of its liquid crystal panel and polarizers from rising.

2. Description of the Related Art

In recent years, a liquid crystal display apparatus which offers as good display quality as CRT display apparatus have been put to practice. Liquid crystal display apparatus, in general, have advantages over CRT display apparatus in terms of their thinness and energy-saving nature. However, such a liquid crystal display apparatus tends to exhibit lowered display performance due to deterioration of its polarizers and liquid crystal display panel (LCD) which is caused when the temperature of its liquid crystal display sections rises.

There has been proposed the art of cooling a liquid crystal display apparatus with use of cooling means to suppress a temperature rise at liquid crystal display sections during their operation. Generally, such cooling is achieved by taking in ambient air present around the liquid crystal display apparatus. This provides a substantial cooling effect but raises a problem that dust adheres to the liquid crystal panel to affect an image displayed. Though there has been proposed a liquid cooling method that is free from such a problem caused by dust in which a liquid crystal panel and polarizers are attached to a cooling container having a coolant circulating therein, this method involves such problems as contortion of a displayed image due to the difference in refraction index between the coolant and air.

The construction of a conventional liquid crystal display apparatus is schematically shown in FIG. 12. As shown, a section having liquid crystal panels 6R, 6G and 6B and polarizers 5R, 5G, 5B, 7R, 7G and 7B accommodated within a hermetic container 13 is cooled by a cooling fan 11.

Since this art achieves cooling by circulating air within the hermetic container 13, a problem caused by dust is not raised. This liquid crystal display apparatus operates as follows.

Light emitted from a light source 1 becomes incident on a polarized beam splitter 2 and is split into P-polarized light and S-polarized light thereby. The P(S)-polarized light component outgoing from the polarized beam splitter 2 is further split into beams having respective wavelengths corresponding to three primary colors (red, green and blue) for which respective liquid crystal panels 6R, 6G and 6B are adapted by dichroic mirrors 3 and reflection mirrors 4. These beams are optically modulated by respective liquid crystal panels 6R, 6G and 6B, then become incident on a prism 8, pass through a projecting lens 9, and are enlargedly projected onto a screen.

Liquid crystal display sections for red, green and blue comprising the polarizers 5R, 5G and 5B on the incident side, the liquid crystal panels 6R, 6G and 6B, and polarizers 7R, 7G and 7B on the outgoing side are disposed within the hermetic container 13 and adapted to be air-cooled by the cooling fan 11.

In order for air from the cooling fan 11 to be efficiently sent to the liquid crystal panels 6R, 6G and 6B and the polarizers 5R, 5G, 5B, 7R, 7G and 7B, the display sections are respectively enclosed by ducts 18R, 18G and 18B each having a sectional area substantially equal to the size of a blowing port through which air flows toward the liquid crystal panels 6R, 6G and 6B and the polarizers 5R, 5G, 5B, 7R, 7G and 7B.

Other known approaches includes use of one axial flow fan for one liquid crystal display section as in a liquid crystal display apparatus described in Japanese Unexamined Patent Publication JP-A 6-194621 (1994), use of a multiblade fan, and use of a crossflow fan.

Further, the art of improving the cooling performance and preventing leakage of noise to the outside is known from Japanese Unexamined Patent Publication JP-A 9-113998 (1997), wherein liquid crystal panels and a cooling fan are disposed within a hermetic container of metal.

Such conventional liquid crystal display apparatus involves the following problems.

(1) The conventional apparatus are not designed to what extent the polarizers and liquid crystal panel for each color should be cooled. For instance, the liquid crystal display apparatus using a single axial flow fan has a difficulty in appropriately distributing a circulating air flow depending on the heat value of each liquid crystal panel and requires an air guide path or guider of an intricate configuration to utilize the total circulating air flow. Where such a guider is used in combination with an axial flow fan, peak noise is generated in proportion to the number of revolutions of the fan to make the total noise louder and harsh.

(2) Since an axial flow fan, even when fixed to either the bottom plate of the hermetic container or another member present in the container, sucks air from the periphery thereof and sends cooling air toward the liquid crystal module, it is necessary to provide a space between the axial flow fan and the bottom plate and, hence, noise generated by the axial flow fan and noise generated when air is sucked by the axial flow fan vibrate the bottom plate, with the result that the vibration propagates to the outside as noise. Such vibration can be reduced by taking measures such as making the bottom plate thicker. In this case, however, the bottom plate is entirely made thicker in spite of the fact that the vibration is generated from the space under the axial flow fan. This makes resin molding difficult and leads to an increase in cost.

(3) Use of a duct extending from the fan is proposed for efficiently directing circulating air to liquid crystal panels. This approach, however, cannot increase the flow velocity of air at a point where the temperature of the liquid crystal panels rises. Consequently, the amount of air to be circulated needs to be augmented, or stated otherwise, it is difficult to decrease the cooling air flow, hence, difficult to achieve efficient cooling.

(4) The arrangement where each liquid crystal display section is provided with a cooling fan in a one-to-one relationship makes the whole apparatus intricate and larger in size while leading to increased cost.

SUMMARY OF THE INVENTION

The invention is made to solve the problems, and an object is to provide a liquid crystal display apparatus in which liquid crystal panels and polarizers can be effectively cooled by a simple arrangement.

The invention provides a liquid crystal display apparatus comprising a light source, a hermetic container, and liquid crystal display sections for red, green and blue, respectively, disposed within the hermetic container, the liquid crystal display sections each having a liquid crystal panel and a polarizer, wherein light emitted from the light source is enlarged and projected, the liquid crystal display apparatus further comprising a first blower for sending cooling air to the liquid crystal display section for blue, and a second blower for sending cooling air to the liquid crystal display sections for red and green, the first and second blowers being disposed within the hermetic container.

In one feature of the liquid crystal display apparatus, the first and second blowers comprise a multiblade fan and an axial flow fan, respectively.

In another feature of the liquid crystal display apparatus, the first and second blowers each comprise an axial flow fan, and the second fan is adapted to send cooling air to one of the liquid crystal display section for red and the liquid crystal display section for green and then to the other liquid crystal display section.

In yet another feature of the liquid crystal display apparatus, one of the first and second fans comprises an axial flow fan which is spaced apart from the hermetic container, and a reinforcing member is provided in a portion of the hermetic container which portion is opposite to the axial flow fan.

In yet another feature of the liquid crystal display apparatus, a side plate is provided between the liquid crystal panel and the polarizer of each of the liquid crystal display sections for respective colors to be placed outside an image displaying portion of the liquid crystal panel and be perpendicular to the polarizer.

The invention also provides a liquid crystal display apparatus comprising a light source, a hermetic container, liquid crystal display sections for red, green and blue, respectively, disposed within the hermetic container, the liquid crystal display sections each having a liquid crystal panel and a polarizer, wherein light emitted from the light source is enlarged and projected, the liquid crystal display apparatus further comprising blowing means for sending cooling air to the liquid crystal display sections for red, green and blue at a ratio of approximately 1:1:4, respectively.

According to the invention, the combinations of polarizers and liquid crystal panels corresponding to red, green and blue are disposed within the hermetic container to prevent dust from adhering to any liquid crystal display section, and the polarizers and the liquid crystal panels can be efficiently cooled.

Further, generation of noise can be suppressed.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
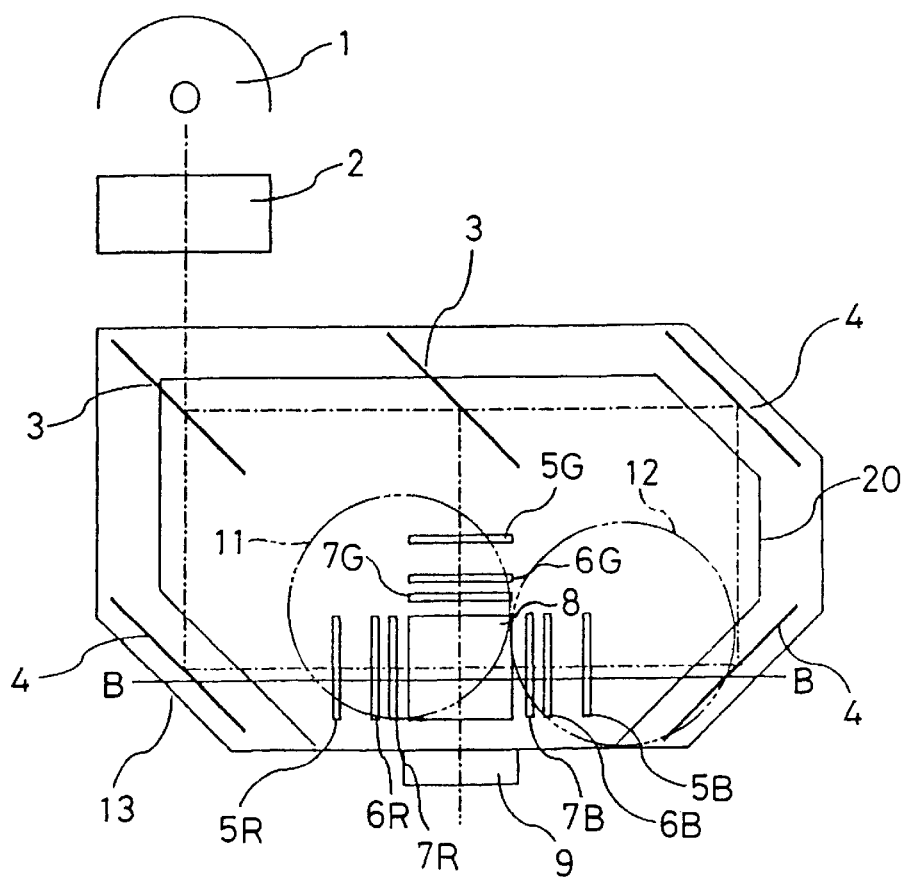
FIG. 1 is a schematic view showing a liquid crystal display apparatus of embodiment 1 of the invention.

Now referring to the drawings, preferred embodiments of the invention are described below.

Embodiment 1

Figure 12:
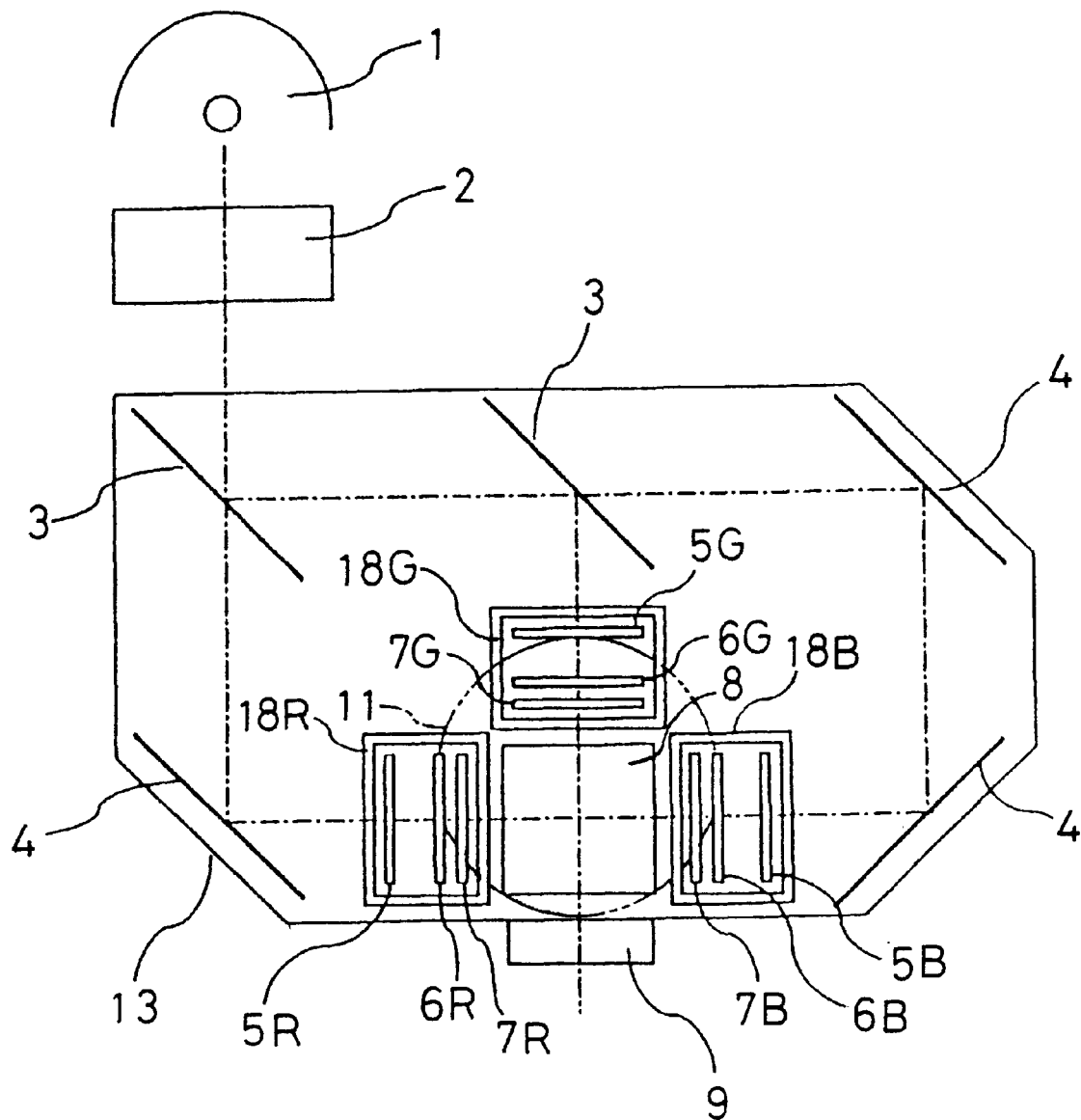
FIG. 12 is a schematic view showing a conventional liquid crystal display apparatus.

The inventor of the invention has measured the surface temperatures of a polarizer and a liquid crystal panel of each liquid crystal display section for each color in a liquid crystal display apparatus and calculated the respective thermal fluxes of the liquid crystal display sections for red, green and blue, to discover the fact that the thermal flux of the display section for blue is greater than those of the display sections for red and green. In a liquid crystal display device as shown in FIG. 12, for example, the thermal fluxes of display sections for red, green and blue were determined as follows:

Red: 0.235 W/cm$^2$

Green: 0.251 W/cm$^2$

Blue : 0.405 W/cm$^2$

These results are attributable to the fact that among liquid crystal panels, the liquid crystal panel for blue is supplied with the largest amount of light in view of such conditions as light source lamp characteristics and visibility.

According to the thermal fluxes resulted, the thermal f lux of the liquid crystal panel for blue was about twice as large as those of the liquid crystal panels for red and green. Where the heat transfer coefficient of a liquid crystal display section for each color (comprising a liquid crystal panel, a polarizer on the incident side, and a polarizer on the outgoing side) is represented as K, the temperature of each display section as $T_p$, and the temperature of cooling air as $T_c$, the heat value Q of each display section is represented by the equation:

$$Q=K(T_p-T_c) \tag{1}$$

Assume that the heat transfer coefficient at the surface of each liquid crystal panel is in proportion to ½ power of the flow velocity of air, it is found from equation (1) that the flow velocity of air at the surface of the liquid crystal panel for blue (i.e., the cooling air flow at the display section for blue) needs to be about four times as high as those at the surfaces of the liquid crystal panels for red and green so as to maintain the temperatures of the three display sections to a substantially equal value.

With the conventional method using only a single cooling fan, it is difficult to distribute cooling air to the three individual display sections at such a high ratio. With the other conventional method using one fan for one display section for each color, the apparatus becomes costly, intricate and larger in size.

By contrast, the invention makes it possible to cool these liquid crystal display sections for respective colors appropriately by relying upon a simple arrangement in which the installation of fans is devised.

FIG. 1 is a schematic view illustrating one embodiment according to the invention. Light emitted from a light source 1 becomes incident on a polarized beam splitter 2 and is split into P-polarized light and S-polarized light thereby. By dichroic mirrors 3 and reflection mirrors 4, the P(S)-polarized light component outgoing from the polarized beam splitter 2 is further split into beams having respective wavelengths corresponding to three primary colors (red, green and blue) for which liquid crystal panels 6R, 6G and 6B are respectively adapted. These beams pass through polarizers 5R, 5G and 5B, respectively, on the incident side; are optically modulated by respective liquid crystal panels 6R, 6G and 6B, pass through respective polarizers 7R, 7G and 7B on the outgoing side, then become incident on a prism 8, and pass through a projecting lens 9 to provide an enlarged projection on a screen.

All the components of the optical system except the light source 1 and the polarized beam splitter 2 are accommodated within the hermetic container 13 so as to prevent dust sucked from the outside by air flow from adhering to the liquid crystal panels 6R, 6G and 6B. Such dust, if adhering to the panels, would be projected as shadow in a displayed image thereby lowering the display quality.

The polarizers on the incident side, liquid crystal panels and polarizers on the outgoing side for respective colors form liquid crystal display sections 50R, 50G, and 50B adapted for respective colors.

The cooling system for the liquid crystal display sections 50R, 50G and 50B in the liquid crystal display apparatus is described below.

Since this embodiment is a closed system in which the liquid crystal display sections 50R, 50G and 50B are accommodated within the hermetic container 13, heat generated by the liquid crystal display sections 50R, 50G and 50B is transferred to air within the hermetic container 13, then to the walls of the container 13, and finally dissipated to the outside from the container walls. For this reason, the temperature of cooling air is relatively high as compared with the case of using outside air directly as cooling air.

For instance, in a case where the temperature of each of the liquid crystal panels 6R, 6G and 6B is to be controlled to 65° C. or lower when the temperature of outside air is 45° C. and that of inside air in the hermetic container 13 is 50° C. which is higher by 5° C. than the temperature of outside air, the temperature difference between the highest temperature of the liquid crystal panels 6R, 6G and 6B and the temperature of cooling air in the closed system is 15° C., while such a temperature difference in an open system directly using outside air directly as cooling air is 20° C. Therefore, the flow velocity of air required in the closed system is $(20/15)^2$ times, i.e., about 1.8 times as high as that required in the open system when calculated based on equation (1). Namely, the cooling air flow required in the closed system is about 1.8 times as large as that required in the open system.

Next, the distribution of cooling air to each of the liquid crystal panels 6R, 6G and 6B in the closed system is considered. Suppose the pressure loss of cooling air during passage through a liquid crystal display section is in proportion to the flow velocity of cooling air, it is desired that a cooling fan to be provided in the closed system should be capable of generating a pressure about twice as high as that provided in the open system and sending an air flow twice as large as that in the open system, according to calculation based on equation (1). Further, it is desired that the cooling system should be designed so that cooling air passing through the liquid crystal panel 6B for blue may have a pressure and an air flow four times as large as that passing through other liquid crystal panels 6G and 6R.

In view of such requirements, this embodiment is provided with one axial flow fan (blowing means: second fan) 11 under the liquid crystal display sections 50R and 50G for red and green and another axial flow fan (blowing means: first fan) 12 under the liquid crystal display section 50B for blue.

Figure 2:
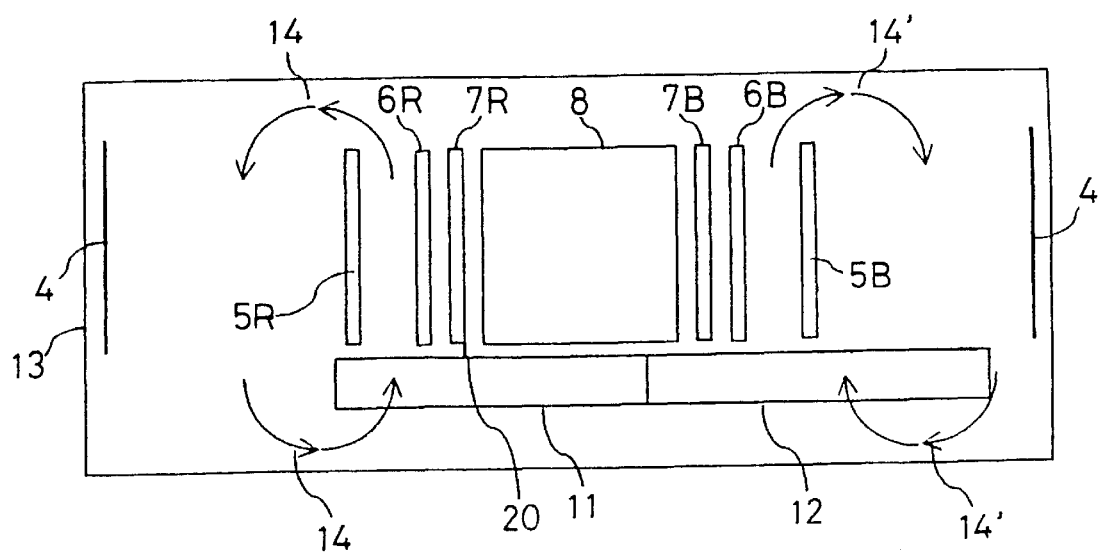
FIG. 2 is a sectional view taken on line B—B in FIG. 1.

FIG. 2 is a sectional view taken on line B—B in FIG. 1 for illustrating cooling air streams generated by the axial flow fans 11 and 12. As shown, cooling air 14 from the axial flow fan 11 first passes through the liquid crystal display sections 50R and 50G for red and green. At this time, the cooling air 14 absorbs heat from the liquid crystal panels 6R and 6G and the polarizers 5R, 7R, 5G and 7G and, hence, the temperature thereof rises. Subsequently, the cooling air 14 reaches the top wall of the hermetic container 13 and the temperature thereof lowers during passage through other components than the liquid crystal display sections. Then, the cooling air 14 reaches the sucking side of the axial flow fan 11 and again circulates toward the liquid crystal display sections 50R and 50G. Distribution of cooling air from the axial flow fan 11 is achieved by guider 20 and the like.

On the other hand, cooling air 14' from the axial flow fan 12 first passes through the liquid crystal display section 50B for blue. At this time, the cooling air 14' absorbs heat from the liquid crystal panels 6B and the polarizers 5B and 7B and, hence, the temperature thereof rises. Subsequently, the cooling air 14' reaches the top wall of the hermetic container 13 and the temperature thereof lowers during passage through other components than the liquid crystal display section. Then, the cooling air 14' reaches the sucking side of the axial flow fan 12 and again circulates toward the liquid crystal display section 50B. As described above, the axial flow fan 12 desirably has an ability four times as high as the axial flow fan 11 for the display sections for red and green.

While the specifications of each fan to be used should be determined through experiments and the like, the necessary capacity of each fan to be used in this embodiment is described below by comparing with the case of the open system.

In the case of the opening system applied to a typical liquid crystal display apparatus as shown in FIG. 12 in which outside air is taken in to cool the liquid crystal display sections, assume the cooling air flow required to cool each of the liquid crystal display sections for red and green is 1, the cooling air flow required to cool the liquid crystal display section for blue is 4, which is four times as large as the cooling air flow for cooling the liquid crystal display section for red. Therefore, a cooling air flow of 6 is required in total. However, it is practically very difficult to distribute cooling air at such a ratio even when a guider is used.

In contrast, in the closed system applied to the liquid crystal display apparatus according to the invention, each of the liquid crystal display sections 50R and 50G for red and green requires a cooling air flow of 1.8 and, hence, a fan having an ability to send a cooling air flow of no more than 3.6 should be used as the cooling fan 11 for cooling liquid crystal display sections 50R and 50G for red and green. On the other hand, the display section 50B for blue requires a cooling air flow of 7.2, which is four times as large as 1.8, and hence a fan having an ability to send a cooling air flow of 7.2 should be used as the axial flow fan 12 for cooling the display section 50B for blue.

Stated otherwise, it is only required that a fan having an ability 0.6 times as high as the cooling fan used in the open system shown in FIG. 12 should be used as the cooling fan 11 for the display sections 50R and 50G for red and green and that a fan having an ability 1.2 times as high as the cooling fan used in the open system shown in FIG. 12 should be used as the cooling fan 12 for the display section 50B for blue.

According to this embodiment thus described, separate provisions of the cooling fan for the liquid crystal display section for blue and the cooling fan for the liquid crystal display sections for red and green make it easy to design the cooling system. This arrangement is capable of sending a larger cooling air flow to the liquid crystal display section for blue than to the liquid crystal display sections for red and green thereby maintaining the temperature of each liquid crystal panel appropriately. Further, since there is no need to distribute cooling air from a cooling fan at a high distribution ratio (in other words, it is only required that cooling air should be distributed to the liquid crystal display sections for red and green at a ratio of 1:1), an efficient cooling operation can be realized.

It should be noted that although this embodiment employs the cooling fans 11 and 12, guider 20 and the like as the blowing means, the blowing means for use in the liquid crystal display apparatus of the invention is not limited thereto, but may be any means which can send cooling air to the liquid crystal display sections 50R, 50G and 50B for red, green and blue at a ratio of about 1:1:4, respectively.

Embodiment 2

While axial flow fans are used as the cooling fans for the liquid crystal display section for blue and for the liquid crystal display sections for red and green in embodiment 1, the axial flow fan, in general, has a problem that when the pressure generated by the axial flow fan increases, the air flow decreases extremely. This embodiment employs a multiblade fan as the cooling fan for the liquid crystal display section for blue to solve such a problem. This embodiment is described below with reference to the drawings.

Figure 3:
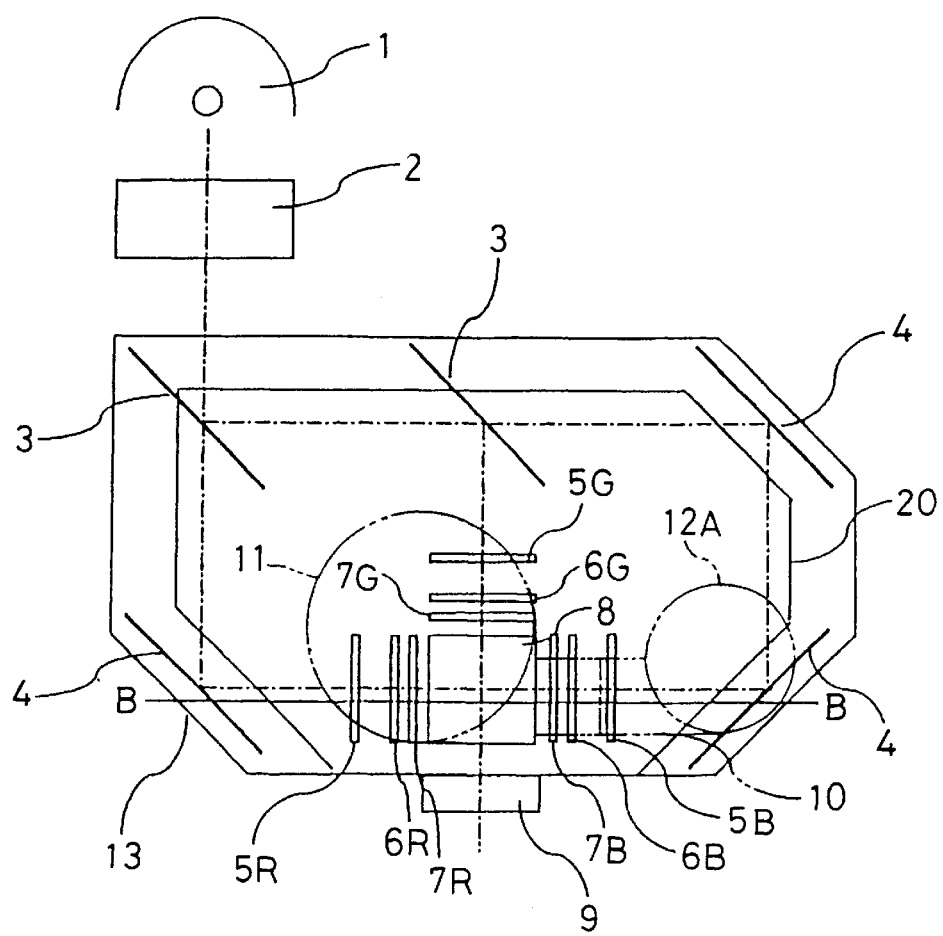
FIG. 3 is a schematic view showing a liquid crystal display apparatus of embodiment 2 of the invention.
Figure 4:
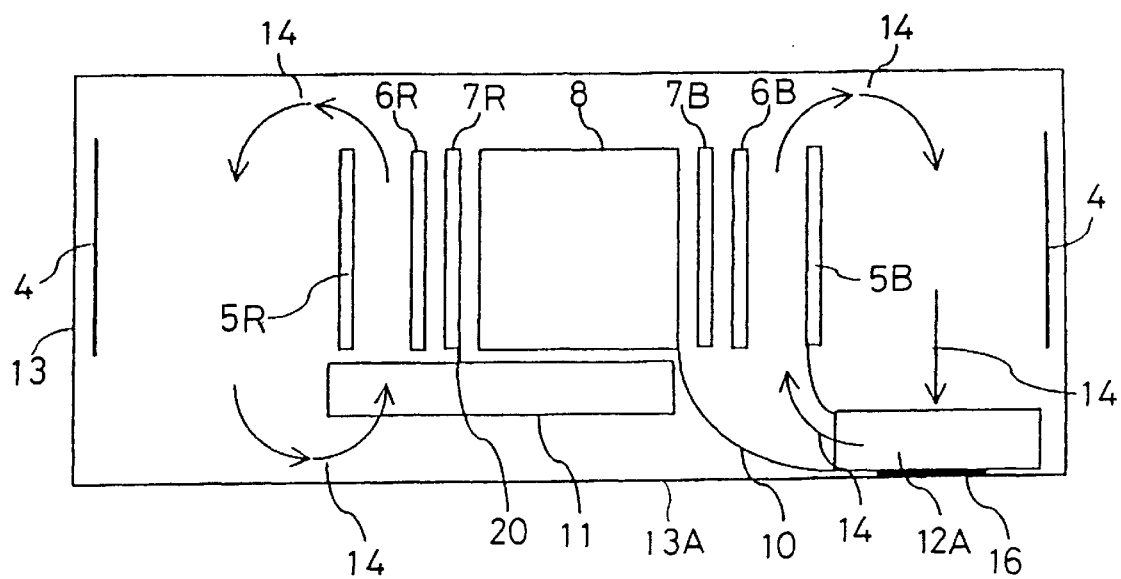
FIG. 4 is a sectional view taken on line B—B in FIG. 3.

FIG. 3 is a schematic view showing the principal part of a liquid crystal display apparatus according to this embodiment. FIG. 4 is a sectional view taken on line B—B in FIG. 3 for illustrating cooling air streams in the embodiment. This embodiment is different from embodiment 1 in that a multiblade fan 12A is used instead of the axial flow fan as the cooling fan for the liquid crystal display section for blue. Since other parts are similar to the corresponding parts of embodiment 1, description thereof is omitted.

The multiblade fan 12A is of a nature that even when a generated pressure increases, a decrease in air flow is small. The multiblade fan 12A sucks air from above and sends air laterally. To efficiently send cooling air by guiding the flow of the laterally blown air in a direction parallel to the sucking direction, the arrangement shown in FIGS. 3 and 4 is provided with an air guide path 10.

Figure 9:
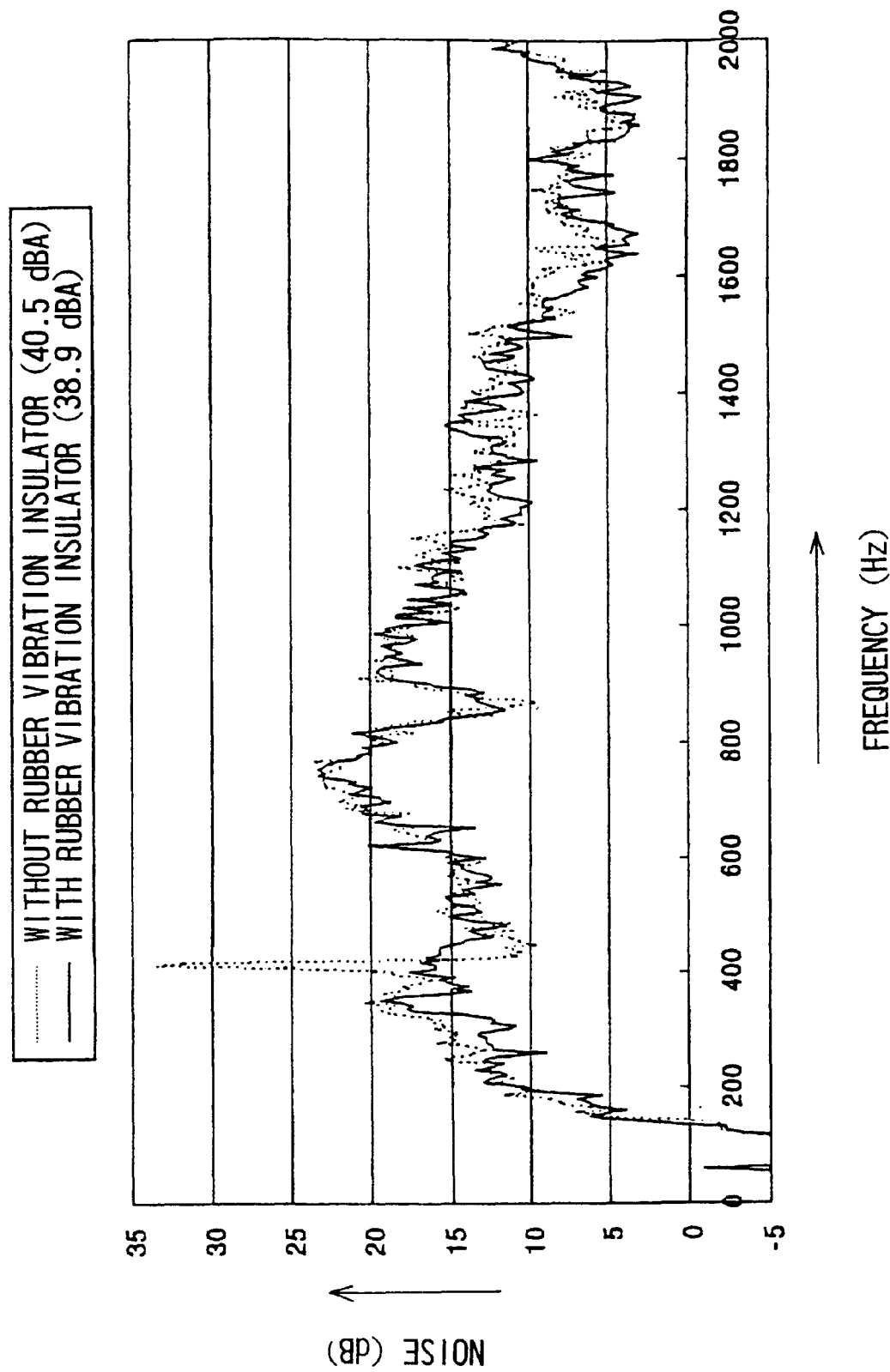
FIG. 9 is a noise spectrum showing an effect resulting when a rubber vibration insulator is inserted between a multiblade fan and a bottom plate.

The air guide path 10 has a small radius of curvature so as to be compactly accommodated within the hermetic container 13. Further, the multiblade fan 12A is fixed as contacting the bottom plate 13A. In this case, the vibration of the motor of the multiblade fan 12A is transmitted directly to the hermetic container 13. To suppress noise caused by such vibration, it is possible to fix the multiblade fan 12A by inserting a vibration insulator (for example, rubber insulator) 16 between the motor section of the multiblade fan 12A and the bottom plate 13A of the hermetic container 13. FIG. 9 is a diagram showing the noise-reducing effect resulted when the vibration insulator 16 was used. As shown, the presence of the vibration insulator 16 in this embodiment prevented generation of large noise at about 400 Hz.

With the arrangement of this embodiment, cooling air from the multiblade fan 12A is led to the liquid crystal display section 50B for blue and absorbs heat from the liquid crystal panel 6B and the polarizers 5B and 7B, with the result that the temperature of the cooling air rises. Subsequently, the cooling air reaches the top wall of the hermetic container 13 and the temperature thereof lowers during passage through other components than the liquid crystal display section. Then, the cooling air 14 reaches the sucking side of the multiblade fan 12A and again circulates toward the liquid crystal display section 50B. It should be noted that though the sucking side of the multiblade fan 12A is oriented upward in FIG. 4, it may be oriented downward in a case where the hermetic container 13 still has a sufficient space.

In embodiments 1 and 2, the axial flow fan 11 is used as the cooling fan for sending cooling air to the liquid crystal display sections 50R and 50G for red and green. In the case of the axial flow fan 11, the liquid crystal display sections are arranged as shown in FIGS. 1 and 3 and, hence, wind generated by the blades of the fan can be utilized only partially. For this reason, the guider 20 as shown in FIGS. 2 and 4 is used to distribute circulating air depending on the heat value of each display section.

Table 1 shows the results of measurement of a temperature rise at each liquid crystal panel and at each polarizer in the arrangement described above by the use of a non-contact thermometer. In Table 1 is shown an averaged value of temperature rises at the liquid crystal panel and polarizers of each display section when the axial flow fan 11 and the multiblade fan 12A were both driven at a constant voltage of 12V. As a comparative example, a temperature rise resulted when the arrangement of the conventional art shown in FIG. 12 was driven at a constant voltage of 12 V is also shown in Table 1.

TABLE 1

|  | Arrangement of embodiment 2 | Arrangement shown in FIG. 12 |
| --- | --- | --- |
| Liquid crystal panel and polarizers for red | 21.1° C. | 22.7° C. |
| Liquid crystal panel and polarizers for green | 20.4° C. | 24.3° C. |
| Liquid crystal panel and polarizers for blue | 22.3° C. | 28.2° C. |

As seen from the results in Table 1, the arrangement of embodiment 2 minimized the difference in temperature rise among the display sections for respective colors and suppressed the temperature rise at each display section, while on the other hand the arrangement of FIG. 12 using a single axial flow fan could neither sufficiently reduce the difference in temperature rise among the display sections for respective colors nor suppress the temperature rise at each display section. Even when the driving voltage was raised in the arrangement of FIG. 12, the difference in temperature rise among the display sections for respective colors could not be sufficiently suppress though the temperature rise at each display section could be suppressed.

The liquid crystal display apparatus of this embodiment thus described exhibits, in addition to the effect of embodiment 1, an effect of stably circulating cooling air.

To be considered next are solutions for problems of noise and vibration essential to the axial flow fan used in embodiments 1 and 2. Since the axial flow fan, even when fixed to either the bottom plate of the hermetic container or another member present in the container, sucks air from the periphery thereof and sends cooling air toward the liquid crystal display sections, it is necessary to provide a space between the axial flow fan and the bottom plate and, hence, noise generated by the axial flow fan itself and noise generated when air is sucked by the axial flow fan vibrate the bottom plate, with the result that the vibration propagates to the outside as noise problematically.

Such vibration can be reduced by taking measures such as making the bottom plate thicker. In this case, however, the bottom plate is entirely made thicker in spite of the fact that the vibration is generated from the space under the axial flow fan. This makes resin molding difficult and leads to an increase in cost.

Figure 7:
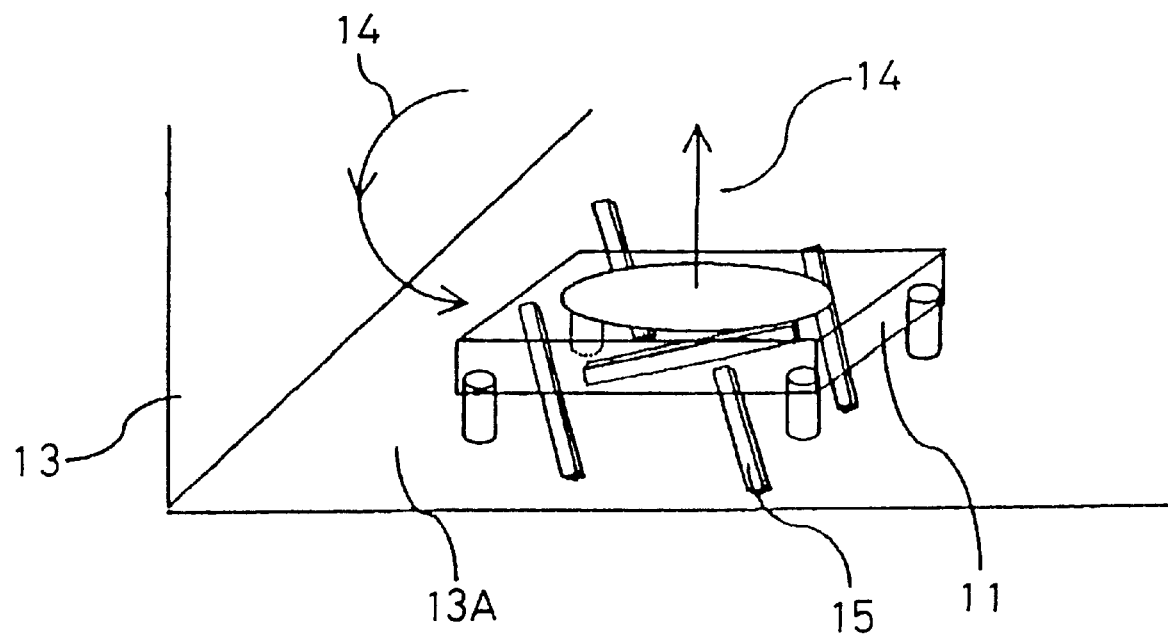
FIG. 7 is a view illustrating a manner of preventing vibration caused by an axial flow fan.

FIG. 7 illustrates a liquid crystal display apparatus in which the bottom plate 13A is reinforced at a portion under the axial flow fan 11 to solve such a problem. Specifically, five ribs (reinforcing members each having a width of 3 mm and a height of 3 mm) 15 are provided as angled relative to the bottom plate 13A.

Figure 8:
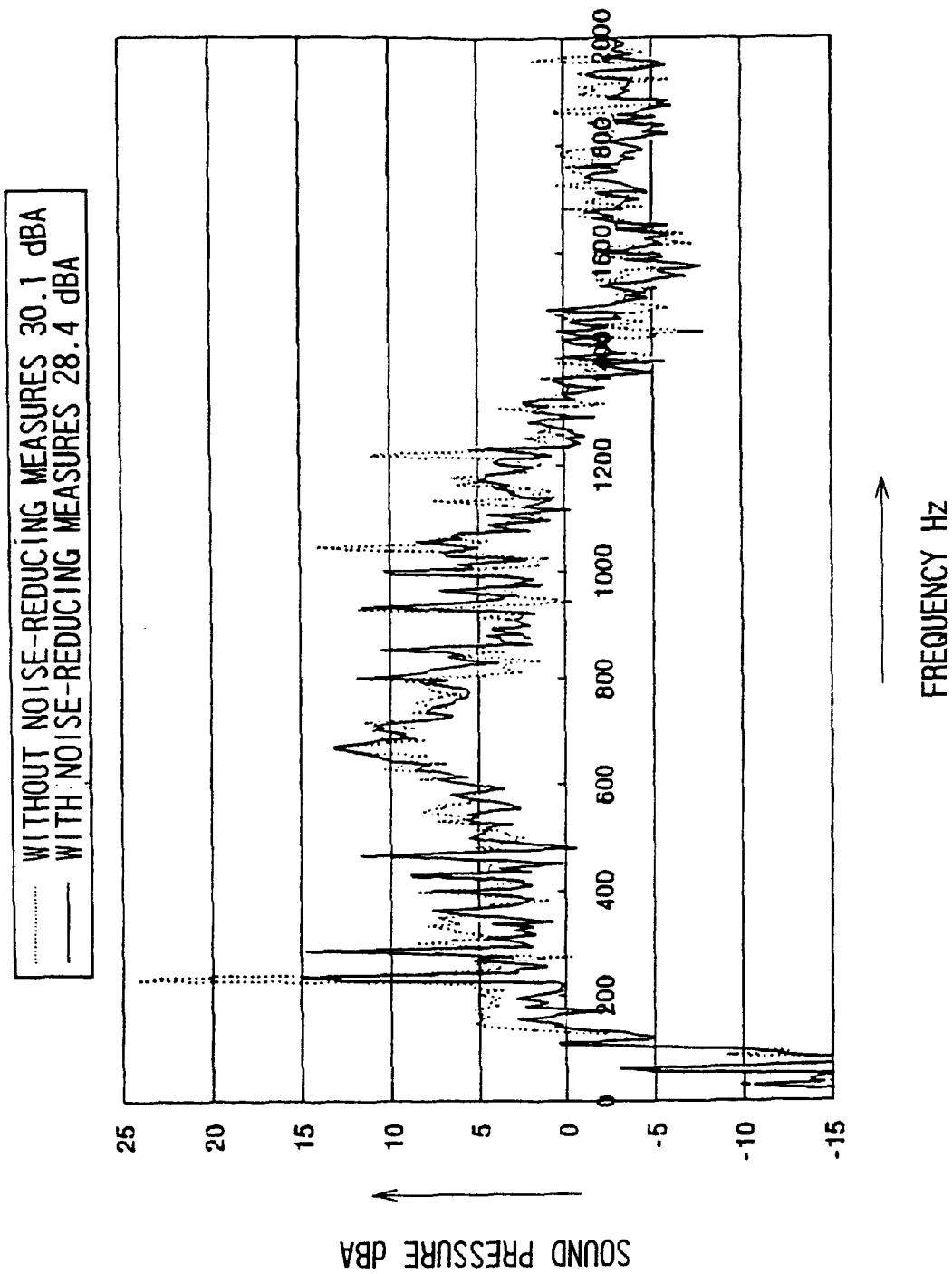
FIG. 8 is a noise spectrum showing a vibration-preventive effect of the manner illustrated in FIG. 7.

FIG. 8 is a diagram showing a noise-reducing effect of this arrangement. As apparently seen from FIG. 8, the provision of the ribs 15 reduced noise caused by vibration of the bottom plate 13A by virtue of the increased rigidity of the bottom plate 13A.

Though the rod-shaped ribs are provided in the arrangement of FIG. 7, there may be employed any reinforcing means such as using plate-shaped ribs or thickening the bottom plate 13A. It is to be noted that the number and position of these ribs should be determined depending on the configuration and specifications of the hermetic container 13 and the specifications of the axial flow fan 11 used.

Embodiment 3

A liquid crystal display apparatus according to this embodiment differs from those of embodiments 1 and 2 in that a multiblade fan is used as the cooling fan for the liquid crystal display sections for red and green, as well as for the liquid crystal display section for blue. The liquid crystal display apparatus of this embodiment is described below but description of like or similar parts corresponding to those of embodiments 1 and 2 is omitted.

Figure 5:
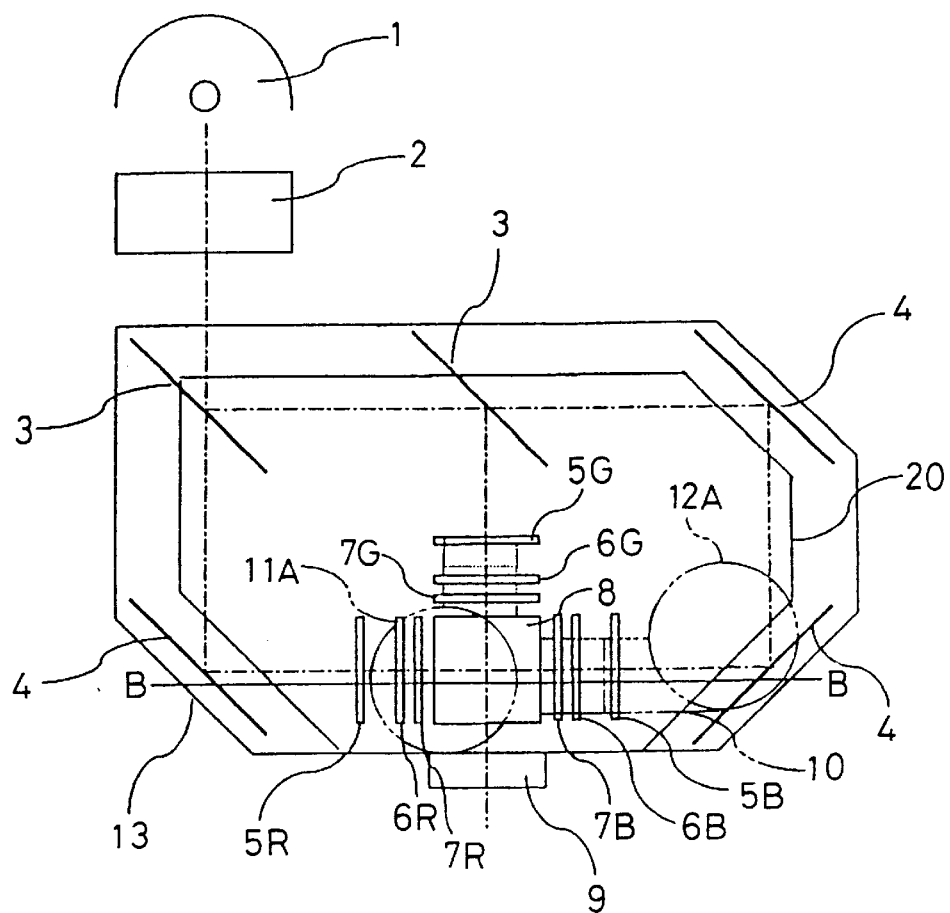
FIG. 5 is a schematic view showing a liquid crystal display apparatus of embodiment 3 of the invention.
Figure 6:
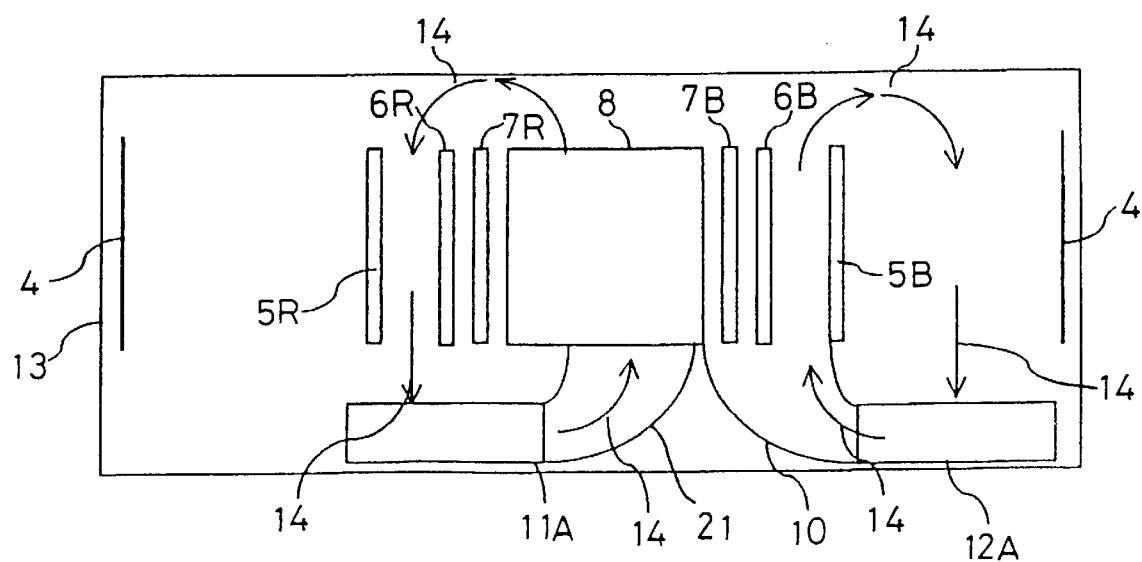
FIG. 6 is a sectional view taken on line B—B in FIG. 5.

FIG. 5 is a schematic view showing the arrangement of the liquid crystal display apparatus according to this embodiment in which a multiblade fan 11A is used for the liquid crystal display sections 50R and 50G also. FIG. 6 is a sectional view taken on line B—B in FIG. 5 for illustrating cooling air streams in this embodiment.

In this embodiment, the multiblade fan 11A sucks air 14 from around the liquid crystal display section components 5R, 6R and 7R for red, and the flow of air is changed by an air guide path 21 and sent toward the liquid crystal display section 50G for green. The cooling air 14 absorbs heat from the liquid crystal display section 50G for green, dissipates heat during its passage inside the hermetic container 13 to lower its temperature, passes through the liquid crystal display section 50R for red while absorbing heat thereof to raise its temperature, and returns to the multiblade fan 11A.

While the multiblade fan 11A is arranged to suck air from around the liquid crystal display section 50R for red in FIGS. 5 and 6, it may be arranged to suck air from around the liquid crystal display section 50G for green and sends air toward the liquid crystal display section 50R for red.

Since the arrangement of this embodiment which does not require the guider 20 as used in combination with the axial flow fan in the arrangement of FIG. 2, a harsh peak noise can be suppressed.

Theoretical considerations are given below of the case of the axial flow fan and that of the multiblade fan.

The heat value of each liquid crystal display section can be represented by equation (1). The temperature rise of cooling air can be represented by the following equation:

$$T_{out} - T_c = Q/\rho C_p V \tag{2}$$

wherein $T_{out}$ represents the temperature at the outlet of each liquid crystal display section, $\rho$ the density of air, Q the heat value, $C_p$ the specific heat, and V the air flow.

Assume the respective heat values of the liquid crystal display sections for red and green are equal to each other and cooling air is distributed to these display sections at an air flow ratio of 1:1, when the axial flow fan is used. The temperature $T_p$ of each liquid crystal display section can be found using equation (1). The temperature $T_p$ thus obtained is represented by equation (3):

$$T_p = Q/K + T_c \tag{3}$$

When the multiblade fan is used, the circulating air flow at the liquid crystal display section through which air passes first is twice larger and, hence, the heat transfer coefficient of the first display section is $\sqrt{2}$ times larger, namely $\sqrt{2}K$. From equation (1), a rise in the temperature $T_{p'}$ of the first liquid crystal display section is $1/\sqrt{2}$ times larger such as equation (4):

$$T_{p'} = Q/\sqrt{2}K + T_c \tag{4}$$

At this time, from the relation with equation (2), the difference in the temperature of circulating air between the display section outlet temperature $T_{out'}$ and the display section inlet temperature $T_c$ becomes ½ such as equation (5)

$$T_{out'} - T_c = Q/(\rho C_p 2V) \tag{5}$$

The temperature of the circulating air at this time becomes the inlet temperature of the next liquid crystal display section. If this temperature is applied to equation (1), the temperature rise $T_{p''}$ of the liquid crystal display section is given such as equation (6):

$$T_{p''} = Q/K(1/\sqrt{2} + K/(\rho C_p 2V)) - T_c \tag{6}$$

To make $T_{p''}$ smaller than $T_p$ obtained by equation (3), it is required that $(1/\sqrt{2} + K/(\rho C_p 2V))$ should be 1 or smaller. Where $K/\rho C_p V$ is 0.77 or smaller, it is preferable to use the multiblade fan to lower the temperature.

Embodiment 4

Figure 10:
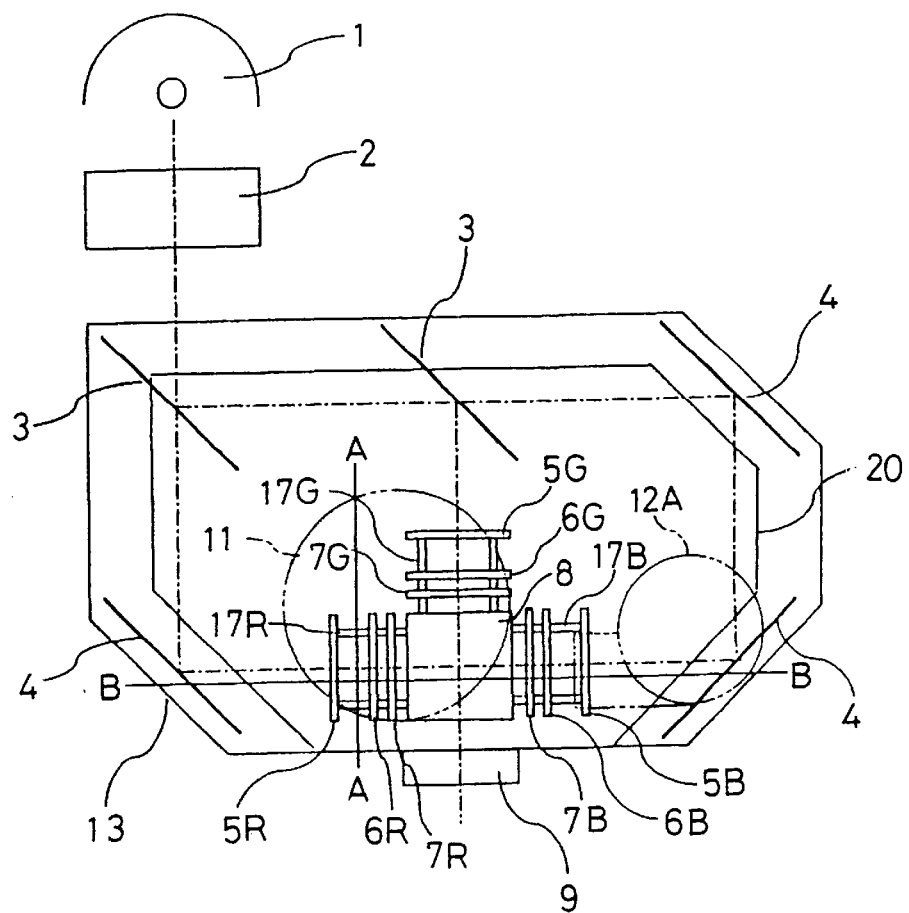
FIG. 10 is a schematic view showing a liquid crystal display apparatus of embodiment 4 of the invention.

FIG. 10 shows a liquid crystal display apparatus according to this embodiment in which the closed-system liquid crystal display apparatus of embodiment 2 is further provided with side plates 17R, 17G and 17B which are parallel to the optical axis and perpendicular to respective liquid crystal panels and polarizers.

These side plates 17R, 17G and 17B are positioned perpendicular to respective liquid crystal panels 6R, 6G and 6B and polarizers 5R, 5G, 5B, 7R, 7G and 7B so that cooling air is sent to portions desired to be cooled of these display sections and polarizers.

Figure 11:
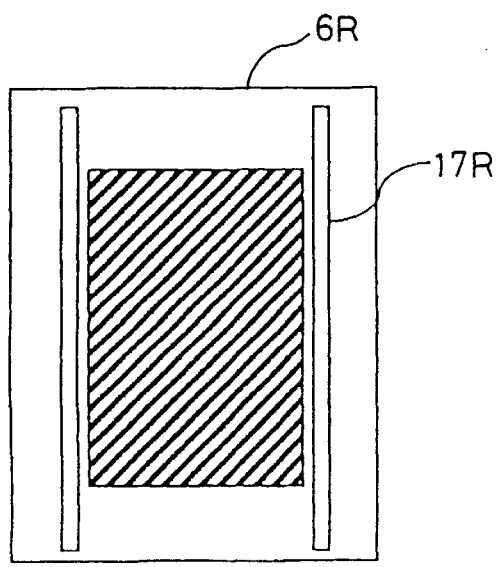
FIG. 11 is an enlarged view illustrating an arrangement of side plates in the liquid crystal display apparatus shown in FIG. 10.

FIG. 11 is an illustration for explaining the position of each of the side plates 17R, 17G and 17B. As shown, each of the side plates 17R, 17G and 17B is positioned adjacent an imaging portion (shaded portion in FIG. 11). When the cooling ability of this arrangement was compared with that of embodiment 2, a temperature rise at each display section could be reduced by about 2° C.

By positioning the side plates adjacent respective liquid crystal panels and polarizers, it is possible to avoid delivery of cooling air to portions which do not require cooling and hence to increase the flow velocity of cooling air passing through the polarizers 5R, 5G, 5B, 7R, 7G and 7B and the liquid crystal panels 6R, 6G and 6B. Thus, the cooling effect can be improved. Each of these side plates 17R, 17G and 17B is not limited to a plate, but may be any material which can form a side surface.

Although the experiment was conducted using the section shown in embodiment 2, as a matter of course the same or similar effect will result in the case of the section shown in embodiment 1 or 3.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A liquid crystal display apparatus comprising:
    a light source;
    a hermetic container; and
    liquid crystal display sections for red, green and blue, respectively, disposed within the hermetic container, the liquid crystal display sections each having a liquid crystal panel and a polarizer,
    wherein light emitted from the light source is enlarged and projected,
    the liquid crystal display apparatus further comprising:
    a first blower for sending cooling air to the liquid crystal display section for blue; and
    a second blower for sending cooling air to the liquid crystal display sections for red and green,
    the first and second blowers being disposed within the hermetic container.

2. The liquid crystal display apparatus of claim 1, wherein the first and second blowers comprise a multiblade fan and an axial flow fan, respectively.

3. The liquid crystal display apparatus of claim 1, wherein the first and second blowers each comprise an axial flow fan, and the second blower is adapted to send cooling air to one of the liquid crystal display section for red and the liquid crystal display section for green and then to the other liquid crystal display section.

4. The liquid crystal display apparatus of claim 1, wherein one of the first and second blowers comprises an axial flow fan which is spaced apart from the hermetic container, and a reinforcing member is provided in a portion of the hermetic container which portion is opposite to the axial flow fan.

5. The liquid crystal display apparatus of claim 1, wherein a side plate is provided between the liquid crystal panel and polarizer of each of the liquid crystal display sections for red, green and blue to be placed outside an image displaying portion of the liquid crystal panel and be perpendicular to the polarizer.

6. The liquid crystal display apparatus of claim 2, wherein a side plate is provided between the liquid crystal panel and polarizer of each of the liquid crystal display sections for red, green and blue to be placed outside an image displaying portion of the liquid crystal panel and be perpendicular to the polarizer.

7. The liquid crystal display apparatus of claim 3, wherein a side plate is provided between the liquid crystal panel and polarizer of each of the liquid crystal display sections for red, green and blue to be placed outside an image displaying portion of the liquid crystal panel and be perpendicular to the polarizer.

8. The liquid crystal display apparatus of claim 4, wherein a side plate is provided between the liquid crystal panel and polarizer of each of the liquid crystal display sections for red, green and blue to be placed outside an image displaying portion of the liquid crystal panel and be perpendicular to the polarizer.

9. The liquid crystal display apparatus of claim 1 wherein said first blower and said second blower send cooling air to the liquid crystal display sections for red, green and blue at a ratio of approximately 1:1:4, respectively.

* * * * *